United States Patent [19]

Cox

[11] Patent Number: 4,684,097

[45] Date of Patent: Aug. 4, 1987

[54] MOBILE HOME STANCHIONS

[76] Inventor: Roger W. Cox, 7690 Jacinto Rd., Elk Grove, Calif. 95624

[21] Appl. No.: 851,822

[22] Filed: Apr. 14, 1986

[51] Int. Cl.⁴ ............................................ F16M 13/00
[52] U.S. Cl. .............................. 248/354.3; 248/354.5; 248/357; 254/98
[58] Field of Search .................... 248/680, 354.4, 352, 248/354.3, 354.5, 357; 254/89 R, 98

[56] References Cited

U.S. PATENT DOCUMENTS

| 496,739 | 5/1893 | Kennedy | 248/354.4 X |
| 3,655,161 | 4/1972 | Schueler | 248/354.5 X |
| 3,713,259 | 1/1973 | Tkach | 248/354.3 X |
| 4,345,734 | 8/1982 | Studinger | 248/354.5 X |

Primary Examiner—J. Franklin Foss
Assistant Examiner—David L. Talbott
Attorney, Agent, or Firm—Mark C. Jacobs

[57] ABSTRACT

Supports for mobile homes having a base, an intermediate vertical support fixedly secured to the base, and an upper mobile home support adjustable mounted at the upper end of the vertical support with means thereon for connection to the underside of a mobile home.

10 Claims, 8 Drawing Figures

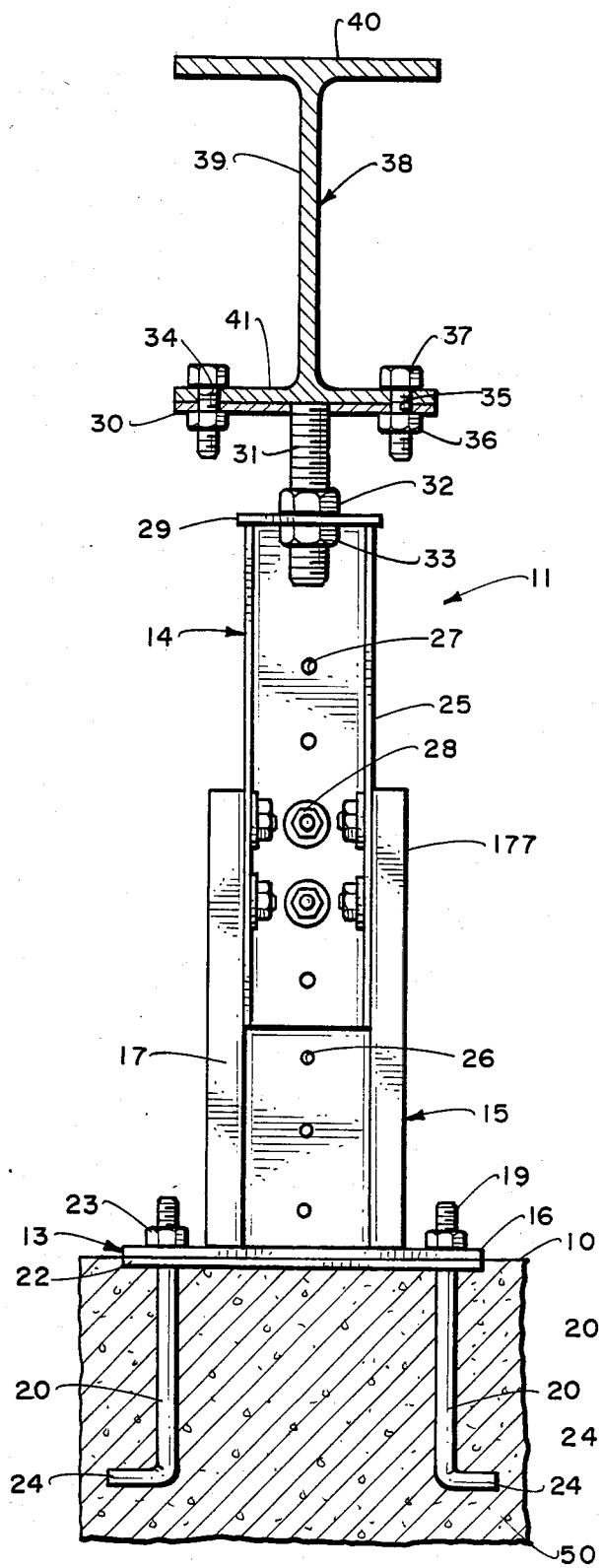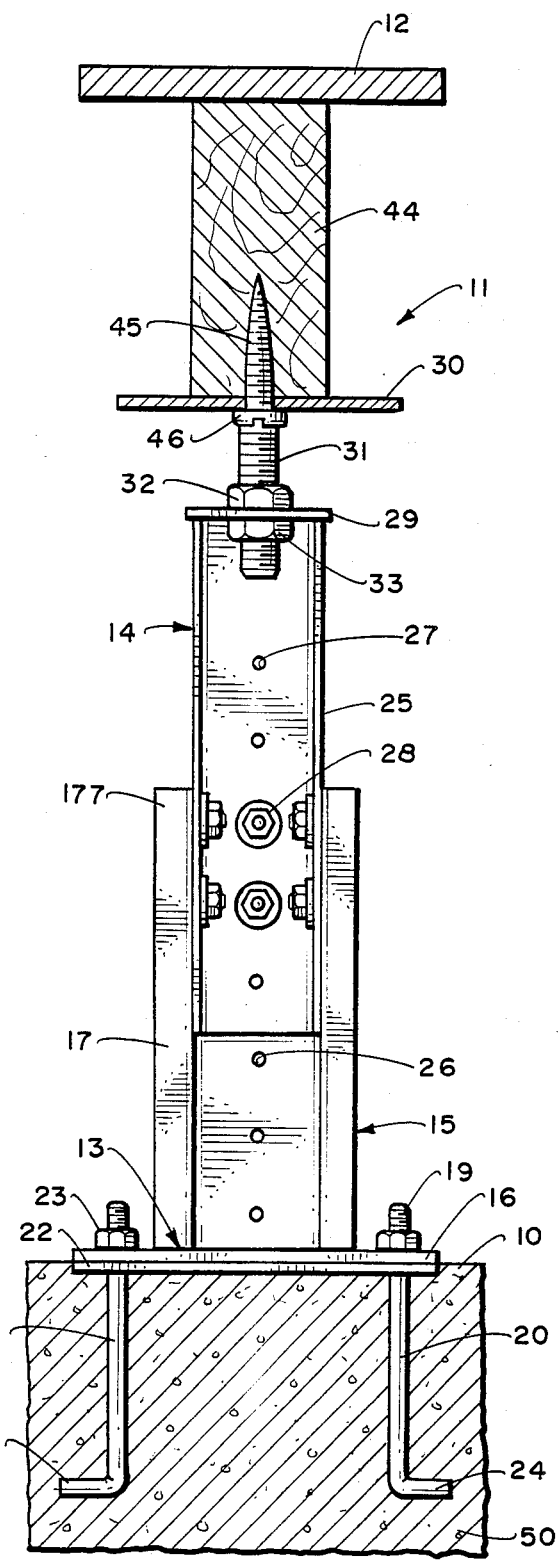

MOBILE HOME STANCHIONS

BACKGROUND OF THE INVENTION

1. FIELD OF THE INVENTION

The invention relates to mobile home supports and more particularly to an improved stanchion for supporting mobile homes.

2. DESCRIPTION OF THE PRIOR ART

Various types of support means have been suggested for mobile homes over the years. Generally, concrete supports of the like may be used and the ground must be perfectly level or some sort of compensating means must be provided for leveling the home. Many states nor require more permanent foundations or support systems for mobile homes having elevation means thereby negating the requirements for perfectly level ground. Such means should also have lateral adjustment to compensate for structural misalignment and means for fine tuning the adjustment between the home and the support.

SUMMARY OF THE INVENTION

It is an object of this invention to provide a support system for a mobile home which is permanent and elevational to compensate for unlevel ground.

It is further object of this invention to provide such a support which includes lateral adjustment to compensate for structural misalignment.

It is still another object of this invention to provide a support which has means for finetuning the adjustment between the under-structure of the mobile home and the support.

It is still further an object of this invention to provide such a support which is easily adapted to be connected to various types of mobile homes under-structures.

Other objects of the invention will in part be obvious and will in part appear hereinafter.

The invention accordingly comprises the apparatus possessing the construction, combination of elements and arrangement of parts which are exemplified in the following detailed disclosure, and the scope of which will be indicated in the appended claims.

For a fuller understanding of the nature and objects of the invention, reference should be had to the following detailed description taken in conjunction with the accompanying drawings.

BRIEF DESCRIPTION OF THE DRAWINGS

FIG. 7 is an elevational view of the support of FIG. 1 in its operable position in the ground.

FIG. 8 illustrates a variant mode of utilizing the stanchion of this invention.

SUMMARY OF THE INVENTION

A stanchion for a mobile home having a base, an intermediate generally U-shaped vertical support fixedly secured to the base, and an upper mobile home support which is adjustably mounted at the upper end of the intermediate vertical support and which upper support has means thereon for connection to the underside of a mobile home. Each stanchion may be laterally adjustable at its base, vertically adjustable at its intermediate vertical support section, and vertically adjustable at the top end of the upper mobile home support to fine tune the leveling of mobile home which is resting thereupon. The stanchion may also be adapted to permit the upper mobile home support to be connected to various types of understructures associated with conventional mobile homes.

DESCRIPTION OF THE PREFERRED EMBODIMENT

Figure 1:
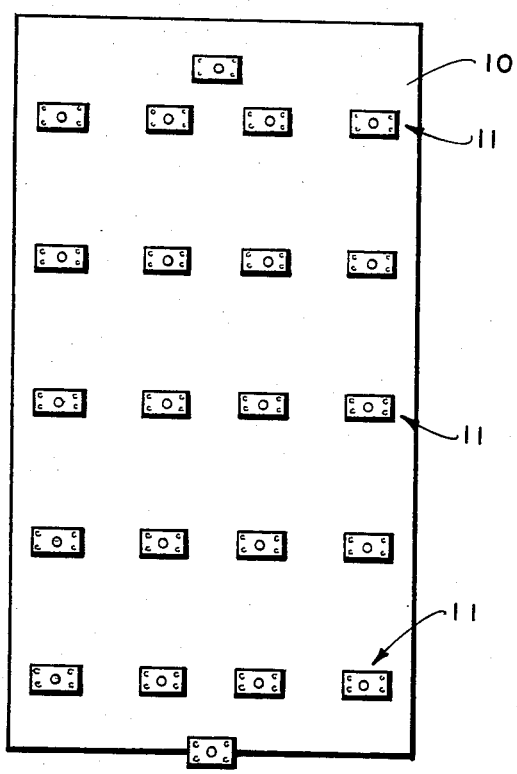
FIG. 1 is a top plan view of the foundation for a mobile home in accordance with the teachings of the invention.
Figure 2:
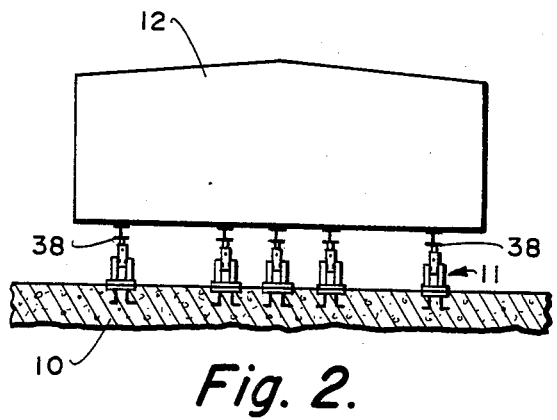
FIG. 2 is a vertical view showing a mobile home installed on the foundation of FIG. 1.

Referring not to FIG. 1 of the drawings, a top plan view is shown of a foundation 10 having a plurality of support means 11, such as between twenty (20) and thirty-two (32), at spaced locations on the foundation 10. Of course, the actual number of placement of such support means is a matter of choice depending on the mobile home requirements and the like. As shown in FIG. 2, a conventional mobile home 12 is shown mounted on support means 11 which, as will be discussed, are firmly anchored in the ground forming foundation 10, and are designated stanchions 11.

Figure 3:
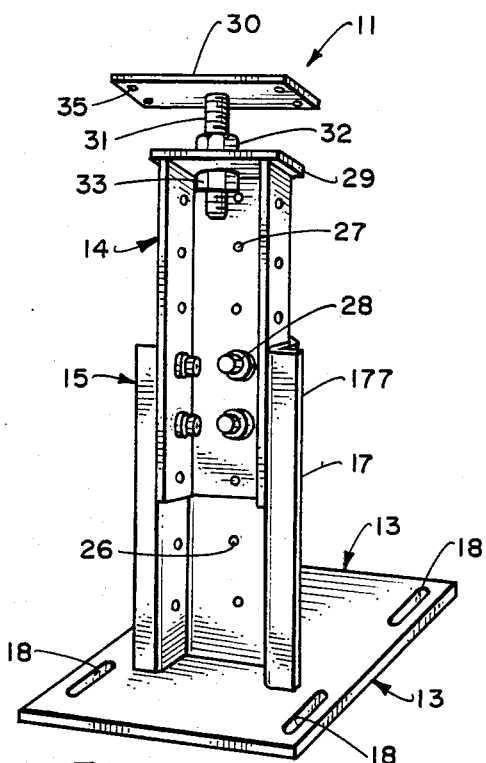
FIG. 3 is a front perspective view of the device of this invention.

One of the stanchions 11 of FIGS. 1 and 2 is shown in front perspective in FIG. 3. It is to be understood that each stanchion 11 of FIGS. 1 and 2 is identical and include supporting base 13, in two parts, per FIG. 6, a mobile home supporting section 14 and a vertically adjustable intermediate section 15, per FIG. 4.

Figure 6:
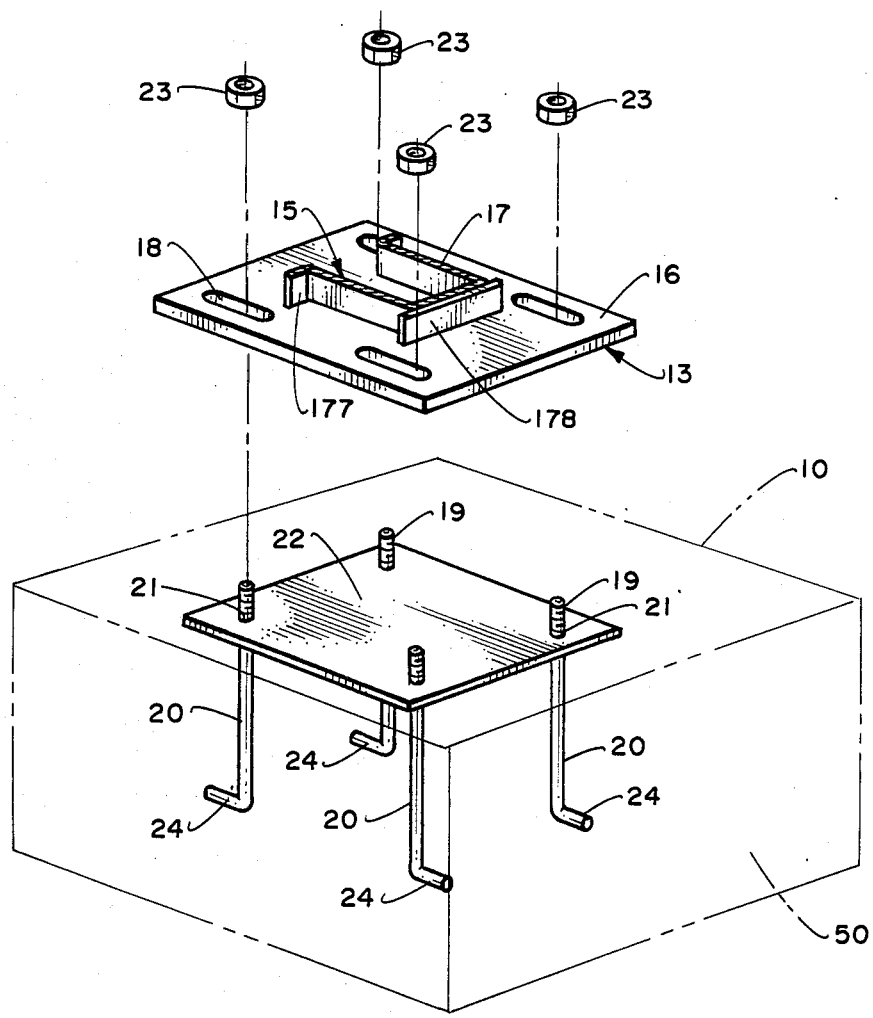
FIG. 6 is a detailed exploded view showing the components and installation of the base of the stanchion of FIG. 1.

Base 13 is shown in exploded view in FIG. 6. Base 13 is comprised of an upper base plate 16 having welded or otherwise secured at substantially the center thereof the flanged U-shape portion 17 of intermediate section 15 (see FIG. 4). The flanges attached to U-portion are designated 177. Base plate 16 has a plurality of longitudinal slots 18, such as four (4), adapted to receive therethrough the treaded ends 19 of a like number of foundation rods 20. These rods 20 (also four (4) in number to correspond to slots 18) extend through and are rotatable in suitable aperture 21 in optional bottom base plate 22. Nuts 23 are threadably removable from ends 19 so that ends 19 can be inserted through slots 18 and nuts 23 then screwed onto ends 19, as will be discussed, to tighten upper base plate 16 to lower base plate 22.

As shown, the rods 20 are J-shaped with the hook ends 24 embedded into concrete 50, shown in phantom lines for clarity, in foundation 10. Plate 22 is generally flush with the surface of foundation 10. The rod 20 can rotate in its respective aperture 21 and is only fixed when bolted tight by means of nut 23 and end 19 and, of course, the cement 50 sets.

Though plate 22 is optional, proper placement of rods 20, to be able to engage the slots 18 of top base plate is most difficult if plate 22 is not employed.

Figure 4:
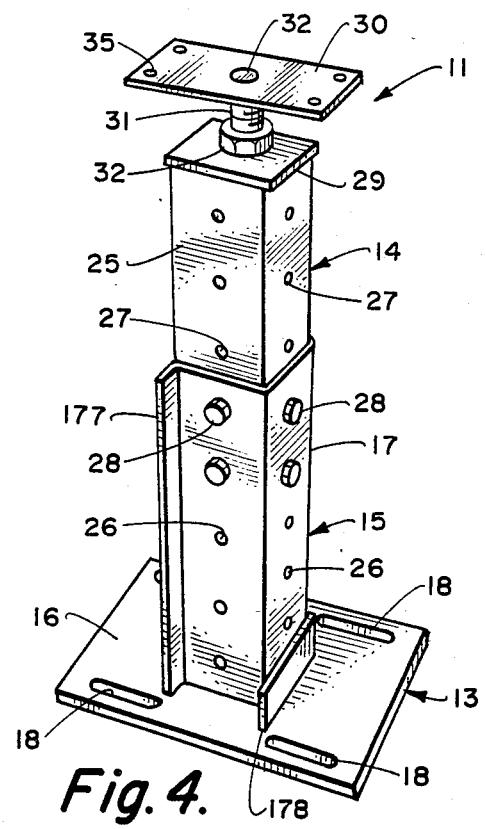
FIG. 4 is a rear perspective thereof.

Intermediate section 15 is comprised of a U-shaped portion 17, having outward depending flanges 177 and a rear vertical plate 178 for strength (FIG. 4). Channel 25 of the mobile home support section 14 is telescopingly received inside of flanged U-shaped portion 17.

The support section's 14 channel 25 is vertically adjustable relative to the intermediate section 15 providing a plurality of aligned spaced holes 26, 27 extending through both flanges U portion 17 and channel 25 respectively with removable nuts and bolts 28 extending through a like aperture in bottom U 17 and through one of the aligned holes 27 in channel 25. For strength six nuts and bolts 28 should be employed on each surface with a washer interposed beneath the nut.

Upper mobile home support section 25 is welded or otherwise secured to the underside of a channel top plate 29, preferably at the center thereof (see also FIG. 3). A home support plate 30 is spaced above bottom base plate 29 and secured thereto by a central threaded post 31, extending downwardly from the underside of support plate 30 through suitable apertures in channel top 29. The post 31 may be welded or otherwise fixedly secured to support plate 30 at 32 and which bolt 31 is loosely mounted to channel top plate 29. Of course, a bolt may be secured to an through home support plate 30 through a recess on the underside of plate 30 by other means. Suitable nuts 32, 33 may be used. In this manner, selectively loosening and tightening of nuts 32, 33 on the post 31 provides quick and easy fine vertical adjustment.

As shown in FIG. 7, a conventional I-beam 38, having an upper flange 40, a lower flange 41 and a vertical intermediate flange 39, is secured to mobile home stanchion 11 by means of lower flange 41 being mounted to the home support plate 30 through apertures 34 in I-beam 38 and apertures 35 aligned with nuts 36 tightened on bolts 37 to securely mount I-beam 38 to support plate 30.

I-beam 38 can also be seen in FIG. 2 and is mounted to the underside of mobile home 12. It is to be understood that suitable lock washers, spacers, etc., as is well known in the art, may be provided with the various nuts and bolts previously described.

Of course, various means may be used to secure the mobile home to the upper supporting section 14. For example, as shown in FIG. 8, the mobile home 12 may be provided with bottom support members or joists 44 of wood which are secured by suitable screws 45 of the like having their heads 46 extending through suitable apertures in plate 30 and screwed into joist 44, which is secured to the underside or floor of mobile home 12.

Figure 5:
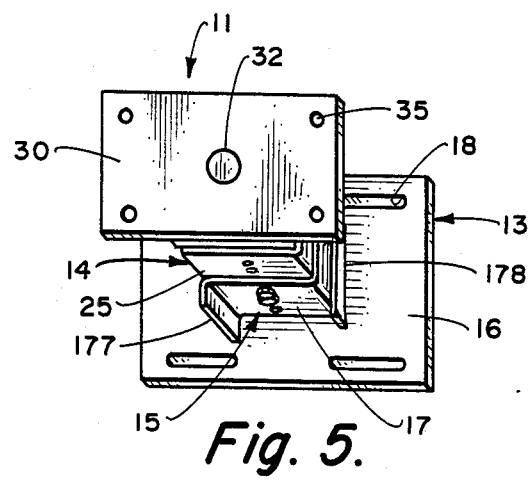
FIG. 5 is a top perspective view of a stanchion of this invention.

Referring again to FIG. 5, the base 13's lower plate 22 is seen to be firmly secured in concrete 50. Vertical adjustment of device 11 is accomplished vertically moving section 14 relative to section 15 and the use of nuts and bolts in the aligned apertures in sections 14 and 15 as previously discussed. Finally, if C-beams not shown are employed on the underside of mobile home 12 a clamp means could be welded to plate 30 to secure said C-beam to device 11. It is seen from FIG. 2 that selective adjustment of each support means 11 as previously described can quickly and easily be used to level mobile home 12 regardless of the irregularity of foundation 10. The instant stanchion when permanently mounted in concrete complies with laws regarding such installations where applicable.

The elongated slots 18 in plate 16 permits lateral adjustment to compensate for any misalignment. This is important since I-beams, for example, are not necessarily true. Obviously, suitable levels are used to judge the level of the mobile home and make the necessary adjustment. The various beams, such as I-beams and C-beams, are drilled when the home is set in place. Screws may be used to secure device 11 to beams. If such are used they go vertically upward as opposed to bolt method of FIG. 7. Such screws are called PEKS screws and are made by Buildex. See FIG. 2.

Any suitable dimensions may be used, for example, flanged U-section 17 may have a $3\frac{1}{4}$ inch O.D. with channel 25 having a three inch O.D.

The foregoing installation can be made quickly and easily. It can be seen that there is described a stanchion for a mobile home which provides a permanent mount for a mobile home while permitting fine adjustment.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A stanchion for a mobile home or the like comprising:
   (a) a base which is laterally adjustable,
   (b) a vertically adjustable telescopic vertical support having an upper end and a lower end,
   (c) an upper mobile home support adjustably mounted at the upper end of said vertical support, said upper mobile home support having mobile home connecting means thereon, which means is adapted to be mounted on the underside of the mobile home,
   wherein said vertically adjustable support includes an intermediate U-shaped section secured to said base and a slightly narrower U-shaped inner channel, each of the intermediate U-shaped section and inner channel having two series of vertically aligned spaced apertures, disposed in a normal relationship on at least two adjacent surfaces of the U-shaped inner channel and the U-shaped section for receiving bolts therein to secure said section and channel in a fixed position to thereby vary the height of said stanchion.

2. In the stanchion of claim 1 wherein said base includes a first plate having said vertical support secured thereto and a second plate below said first plate, a plurality of longitudinal slots in at least one of said first or second plates, and a plurality of bolts extending away from said vertical support, through both said slots and apertures aligned in with said slots in the other of said first or second plates.

3. In the stanchion of claim 2 wherein said bolts are J-shaped rods having upper threaded ends extending through said slots and apertures and loosely mounted in said apertures, hook-shaped ends opposite said threaded ends, and nuts threadable onto said treaded ends to secure said first and second plates together.

4. In the stanchion of claim 1 wherein the upper mobile home support includes a first plate fixedly secured normal to a channel at the top thereof, and a second plate above said first plate adjustably connected to said first plate.

5. In the stanchion of claim 4 wherein said second plate is interconnected to said first plate by a threaded shaft fixedly secured to the upper of said plates and extending through an aperture in the other of said plates and terminating at the other of said plates in threaded ends having nuts threadably mounted on said threaded ends on both side of the other of said plates.

6. In the stanchion of claim 5 wherein said upper plate is rectangular with at least four apertures therein, one at each corner of said plate for receiving screws or bolts therein for connecting said second plate to the joist or I-beam of a mobile home.

7. In the stanchion of claim 1 wherein said base includes securing means thereon for mounting said base in a concrete booting laterally adjustable.

8. In the stanchion of claim 7 wherein said interstate U-shaped section, includes an outwardly depending flange at the terminal of the arms of the U.

9. In the stanchion of claim 1 wherein the vertically aligned apertures are present in all three faces of both of the U-shaped intermediate section and the inner channel.

10. In the stanchion of claim 2 wherein said securing means includes a base plate having a plurality of downwardly extending J-shaped rods adapted to extend into a concrete footing and hold said base plate in a fixed immovable position when said concrete sets.

* * * * *